United States Patent
Keller

(10) Patent No.: US 10,293,517 B2
(45) Date of Patent: May 21, 2019

(54) PROCESS FOR EXTRUSION OF PLASTICIZED PVB FILM WITH REDUCED PLATE-OUT OF ADHESION CONTROL AGENT RESIDUES

(71) Applicant: KURARAY EUROPE GMBH, Hattersheim (DE)

(72) Inventor: Uwe Keller, Hattersheim (DE)

(73) Assignee: KURARAY EUROPE GMBH, Hattersheim (DE)

( * ) Notice: Subject to any disclaimer, the term of this patent is extended or adjusted under 35 U.S.C. 154(b) by 189 days.

(21) Appl. No.: 15/248,314

(22) Filed: Aug. 26, 2016

(65) Prior Publication Data

US 2017/0057120 A1   Mar. 2, 2017

(30) Foreign Application Priority Data

Aug. 30, 2015   (EP) .................. 15183071.8

(51) Int. Cl.
| | | |
|---|---|---|
| *B29B 13/00* | (2006.01) | |
| *B29C 47/00* | (2006.01) | |
| *B32B 17/10* | (2006.01) | |
| *C08J 5/18* | (2006.01) | |
| *C08K 5/00* | (2006.01) | |
| *C08K 5/09* | (2006.01) | |
| *C08K 5/098* | (2006.01) | |
| *C08K 5/103* | (2006.01) | |
| *B29K 31/00* | (2006.01) | |

(52) U.S. Cl.
CPC .......... *B29B 13/00* (2013.01); *B29C 47/0021* (2013.01); *B32B 17/10761* (2013.01); *C08J 5/18* (2013.01); *C08K 5/00* (2013.01); *C08K 5/09* (2013.01); *C08K 5/098* (2013.01); *C08K 5/103* (2013.01); *B29C 47/0004* (2013.01); *B29K 2031/00* (2013.01); *C08J 2329/14* (2013.01); *C08K 5/0016* (2013.01)

(58) Field of Classification Search
CPC ....................................................... B29B 13/00
See application file for complete search history.

(56) References Cited

U.S. PATENT DOCUMENTS

| | | | | |
|---|---|---|---|---|
| 4,123,585 A | * | 10/1978 | Sparzak ................... | C08K 5/12 428/379 |
| 7,312,275 B2 | | 12/2007 | Papenfuhs et al. | |
| 7,358,304 B2 | | 4/2008 | Papenfuhs et al. | |
| 7,511,096 B2 | | 3/2009 | Papenfuhs et al. | |
| 7,528,192 B2 | | 5/2009 | Papenfuhs et al. | |
| 2003/0166788 A1 | * | 9/2003 | Papenfuhs ........ | B32B 17/10761 525/328.7 |
| 2012/0202070 A1 | * | 8/2012 | Asanuma .......... | B32B 17/10761 428/412 |

FOREIGN PATENT DOCUMENTS

| | | |
|---|---|---|
| DE | 19756274 A1 | 6/1999 |
| EP | 1022261 A1 | 7/2000 |
| EP | 1527107 A1 | 5/2005 |
| EP | 1606325 A1 | 12/2005 |
| WO | 99/44821 A1 | 9/1999 |
| WO | 03/020776 A1 | 3/2003 |
| WO | 2004005358 A1 | 1/2004 |
| WO | 2004063231 A1 | 7/2004 |
| WO | 2004063232 A1 | 7/2004 |

* cited by examiner

*Primary Examiner* — Joseph A Miller, Jr.
(74) *Attorney, Agent, or Firm* — Brooks Kushman P.C.

(57) ABSTRACT

The invention is directed to a process for extrusion of mixtures comprising at least one polyvinyl acetal, at least one plasticizer and least one earth alkaline salt of a carboxylic acid, wherein 0.001%-1 wt. % (based on the combined weight of PVB resin and plasticizer) of at least one organic acid having 4 to 30 carbon atoms is added to the mixture.

19 Claims, No Drawings

PROCESS FOR EXTRUSION OF PLASTICIZED PVB FILM WITH REDUCED PLATE-OUT OF ADHESION CONTROL AGENT RESIDUES

CROSS-REFERENCE TO RELATED APPLICATIONS

This application claims priority to European Patent Application No. 15183071.8 filed Aug. 30, 2015, the disclosure of which is incorporated in its entirety by reference herein.

BACKGROUND OF THE INVENTION

1. Field of the Invention

The present invention relates to an improved process for extrusion of plasticized PVB comprising an adhesion control agent to a film for use in laminated safety glass.

2. Background Art

In the art of production and formulation polyvinyl acetals, it is widely accepted that acidic conditions are to be avoided in order to prevent a formed polyvinyl acetal from reacting back into polyvinyl alcohol and aldehyde. More specifically, in the production of polyvinyl butyral, the condensation reaction between butyric aldehyde and polyvinyl alcohol typically is catalyzed by mineral acids which during subsequent workup need to be carefully washed out and neutralized by alkaline compounds such as alkali metal hydroxides. Otherwise, strong acid easily promote cleavage of the butyral rings at elevated temperatures concomitant with yellowing. Under the conditions of extrusion, acid-containing PVB therefore easily turns yellow to brown and a certain amount of butyric aldehyde is cleaved from the polymer thus altering the properties of the PVB resin.

It is therefore common practice to employ PVB resin containing a certain amount of alkaline compounds, like alkali hydroxide. The degree of alkalinity in a PVB resin is usually measured and expressed as the "alkaline titer", where positive titers indicate the presence of hydroxide and or other alkaline species such as for example carboxylate ions. Excess alkali metal salts can agglomerate and precipitate, causing "blushing." EP 1022261 teaches extensive washing to remove these species, use of neutralizing agents such as epoxides rather than alkali hydroxide, or the addition of organic acids, phosphatic acids and amines to the PVB mixture as dispersion agent to keep the salts dispersed.

In the case of PVB film intended for use in laminated safety glass, sheet alkalinity can be further increased by addition of so called adhesion control agents (ACA). Commonly used for this purpose are carboxylates of either alkali or alkaline earth metals. It is understood that carboxylate ions act as weak bases and this contributes to sheet alkalinity. Potassium acetate or formate have been used in the past, but more recent PVB formulations mainly contain magnesium carboxylates, namely magnesium acetate and or magnesium salts of higher carboxylic acids such as 2-ethyl butyrate.

Regarding durability performance and robustness against defect formation for the finished laminates, use of magnesium ions typically results in superior properties compared to PVB film in which adhesion control is effected by potassium ions. More particularly, magnesium ions contribute less to edge whitening upon water ingress at the unprotected laminate edge, which easily occurs in humid environments. Also, the adhesive strength of such PVB film on the glass surface will be less dependent on the water concentration at the glass-PVB interface. But in general, a completely moisture independent adhesion cannot be achieved by addition of magnesium carboxylates. As a tendency, adhesion strength will be higher at lower moisture contents and vice versa. If a too dry PVB film is used for lamination of windscreens—e.g. after heating and stretching of the PVB which is commonly used to preform individual PVB blanks for lay-up—the resulting laminate adhesion may be too high and detrimental to the shock resistance of the laminate.

PVB film used for laminated glazing is produced by extrusion of a melt comprising PVB resin and plasticizer from a slit die, wherein the PVB resin can be pre-blended with plasticizer or simultaneously fed with liquid plasticizer into the extruder. Further additives such as heat stabilizers can be added to the mixture before extruding or can be supplied into the extruder with the plasticizer. For addition of ACA, it is common to feed the ACA as an aqueous solution in parallel to feeding the resin and the plasticizer.

However, using Mg-carboxylates as an ACA also causes problems in the extrusion process. It has been observed that after certain time of production, a whitish layer builds up inside the extruder and/or on the inner walls of the extrusion die and/or the die lip. This whitish layer makes it difficult to adjust and/or keep constant the thickness of the sheet as the melt exits the die.

Formation of the whitish layer triggers interruption of the production process due to the necessity to conduct some tedious cleaning to remove the layer. In other words, it is highly desirable to reduce and ideally completely avoid formation of such a whitish layer in order to increase up-time of production.

Chemical analysis of the whitish material has revealed that it contains Mg in very high concentration as high as 20% by mass. Although the exact chemical nature of the white material is not fully known, there is some indication that a form of Mg-hydroxide is its main constituent. Based on such observation it is speculated that the whitish residues are generated by hydrolysis of Mg-carboxylates into a form of Mg-hydroxide which in turn has reduced solubility in the PVB/plasticizer melt and will thus attach itself over time to the extruder and extrusion die walls. The source of hydroxide ions hydrolyzing the Mg-Carboxylate is thought to be residual alkali metal hydroxide added to the PVB resin to maintain a defined alkaline titer for preventing decomposition of the PVB polymer during extrusion.

SUMMARY OF THE INVENTION

Accordingly, there is a need to improve the extrusion process of PVB sheets containing Mg-salts as an ACA in such a manner that hydrolysis of Mg-salt based ACA will occur at a slower rate or is completely suppressed, and the concomitant disadvantageous buildup of a Mg-rich layer inside the extrusion die would be prevented or largely reduced. It was surprisingly found that weak organic acids prevent or at least reduce the decomposition of a PVB mixture during extrusion without negatively affecting the adhesion characteristics of the finished PVB film in a laminate.

DETAILED DESCRIPTION OF THE PREFERRED EMBODIMENTS

The weak organic acids are added to the mixture to be extruded, for example comprising PVB resin, residual alkaline metal hydroxide, plasticizer and ACA solution. By increasing the acidity of the melt through addition of weak organic acids, formation of Mg-rich deposits is effectively suppressed, resulting in improved feasibility of thickness adjustment and longer uninterrupted production runs.

An object of the present invention is therefore to provide a process for extrusion of a mixture comprising at least one polyvinyl acetal, at least one plasticiser and least one earth alkaline salt of a carboxylic acid, wherein 0.001%-1 wght % (based on the combined weight of PVB resin and plasticizer) of at least one organic acid having 4 to 30 carbon atoms are added to the mixture.

The term "weak acid" used in the present invention refers to organic acids having 4 to 30 carbon atoms as further explained. The terms "PVB film" or PVB sheet is used for plasticized films comprising polyvinyl acetal resin, especially polyvinyl butyral.

In the present invention, organic acids are added to the mixture to be extruded, either before or during extrusion. It is important that organic acids are added in their acid form and not as a salt. As shown in the present examples, the addition of salts of a carboxylic acid alone is not sufficient to achieve the beneficial effect of the present invention.

Preferred organic acids have 4 to 22 carbon atoms, 6 to 18 carbon atoms, 10 to 14 carbon atoms or 10 to 12 carbon atoms. Most preferred are organic acids which are branched in the alpha position to the carboxylic acid moiety. Other substitution patterns prone to reduce the acidity (i.e. increase acidity constant $pK_a$) relative to the acidity of a non-substituted organic acid can be employed according to the invention. Apart from substituents reducing the acidity, the organic acid can contain additional functionalities like hydroxyl groups, ether groups, one or more additional carboxylic groups, either in the acid form or neutralized and so forth. As far as expressible in terms of acid strength, organic acids with a $pK_a$-value of 4.75 (25° C.) or higher are suitable in the present invention. Organic acids will not exhibit $pK_a$-values higher than 7.00.

Preferably the weak organic acid is of the branched type of a so called Versatic® acid, like those selected from the group consisting of 2,2-dimethyl propionic acid, 2,2-dimethyl butyric acid, 2,2-dimethyl pentanoic acid, 2,2-dimethyl hexanoic acid, 2,2-dimethyl heptanoic acid, 2,2-dimethyl octanoic acid, 2,2-dimethyl nonanoic acid, 2,2-dimethyl decanoic acid.

The preferred Versatic® acid is Versatic® acid 10. Also other mixtures of alpha branched "neo" acids wherein the alpha carbon atom is a quaternary carbon as for example neodecanoic acid (CAS 26896-20-8) or neopentanoic acid (CAS 75-98-9) may be used. Examples of alpha branched acids wherein the alpha carbon atom is a tertiary carbon atom are 2-ethyl hexanoic acid, 2-ethyl butyric acid, 2-propyl heptanoic acid. Examples of weak linear acids are palmitic and stearic acid.

Preferable, the mixture contains 0.001%-1 wt. % (based on the combined weight of PVB resin and plasticizer) of organic acid. Preferred concentrations of organic acid are 0.005-0.5 wt. %, 0.0075-0.25 wt. %, 0.01-0.1 wt. % and most preferably 0.02-0.06 wt. %, each based on the combined weight of PVB resin and plasticizer.

The process of the invention can be performed in several embodiments.

In a first embodiment, the organic acid is added to the mixture before extrusion, i.e. by mixing the ingredients of the mixture before entering the extrusion line.

In a second embodiment, the organic acid is added to the mixture during extrusion, i.e. by mixing the ingredients of the mixture in the extrusion line.

In a third embodiment, the organic acid may be dissolved or suspended in the plasticizer prior to extrusion and then added to the mixture together with the plasticizer. The addition to the mixture may be according the first or second embodiment.

In a forth embodiment, the organic acid may added together with the least one earth alkaline salt of a carboxylic acid for example as aqueous solution or suspension. The addition to the mixture may be according the first or second embodiment.

In a fifth embodiment, the organic acid may be added to the mixture separately, for example in liquid or solid form or as solution in water or an appropriate organic solvent. The addition to the mixture may be according the first or second embodiment.

In order to reach an optimum between adhesion control performance of the finished PVB film to glass, low incidence of deposit formation during extrusion and low sheet haze and yellowness, balancing of the amount of added alkaline earth metal salts, alkalinity level of the polyvinyl acetal used and alkaline and acid titer in the resulting sheet should be adjusted.

The amount of Mg-ions added as adhesion control agent (ACA) before or during extrusion of the PVB resin to make the PVB sheet, preferably results in Mg-ion contents of 5-200 ppm in the finished sheet. A more preferred content is 10-100 ppm and further preferred is 20-60 ppm. The most preferred range is 25-50 ppm Mg. The Magnesium ions can be added to the mixture in form of Mg-carboxylates such as Mg-formate, acetate, propionate, butyrate, pentanoate, hexanoate, heptanoate, octanoate, nonanoate, decanoate and so forth. Preferably, the earth alkaline salt of carboxylic acids is selected from the group consisting of Magnesium acetate, Mg-2-ethylbutyrate, Mg-2-ethylhexanoate and Mg-neodecanoate. Other Mg-salts such as derived from benzoic acid, sulfonic acids and the like may be employed as well. Alternative or additional to Mg, other bivalent metal salts such as calcium or zinc may be employed in their analogous forms of salts. A preferred way of dosing an ACA solution is in a form of an aqueous solution directly into the extruder.

In addition to the above mentioned bivalent salts, alkali metal salts may be added or be present to optimize adhesion control properties in amounts as low as 0.001% by weight based on the combined weight of polyvinyl acetal and plasticizer. Preferred salts are analogous to the carboxylates detailed above. In addition, further to such carboxylates, alkali metal chlorides, nitrates and sulphates can be added to or can be present in the extrusion mixture. The preferred ranges of alkali metal salt are 0.001-0.1 wt. %; 0.005-0.05 wt. %; 0.008-0.06 wt. %, based on the weight of the mixture of polyvinylacetal and plasticizer.

As alkali metal ions, potassium or sodium or lithium are preferred. Preferred ranges of concentration of the alkali metal ions in the resulting sheet are 1-20 ppm, more preferably 2-10 ppm in the case of lithium, 2-70, preferably 5-50 and more preferably 7-40 ppm in the case of sodium and 4-250, preferably 8-150 ppm and more preferably 10-100 in the case of potassium. Preferred alkali metals are potassium and sodium, potassium being particularly preferred.

The alkaline titer of the polyvinyl acetal polymer resin prior to extrusion is preferred to be in a range of −10 (minus 10) to 50 ml (0.01 mol/1 HCl) per 100 g of PVB resin. A more preferred range is −5 (minus 5) to 25. A further preferred range is 0 to 20 and the most preferred range is 5-15 ml (0.01 mol/1 HCl) per 100 g of PVB resin. It is preferred that the alkaline titer stems from residual sodium hydroxide present in the PVB resin. Alternatively, the alkaline titer can stem from residual potassium hydroxide present in the PVB resin.

The alkaline titer of the plasticized polyvinyl acetal sheet after extrusion is preferably 15-80 ml (0.01 mol/l HCl) per 100 g of PVB sheet, preferably 20-60 ml and more preferably 25-50 ml (0.01 mol/l HCl) per 100 g of PVB sheet (=25-50 ATS units)

The acid number of the mixture after extrusion is preferably 0-10 meq/kg PVB sheet, preferentially 1-8 meq and more preferably 2-5 meq/kg PVB sheet (=2-5 ANS units)

In another variation of the invention, the laminated glass produced with the polyvinyl acetal sheet according to the invention may have a compressive shear strength according to DE 197 56 274 A1 of, in order of increasing preference, between 22 N/mm$^2$ and 4 N/mm$^2$, between 20 N/mm$^2$ and 4 N/mm$^2$, between 18 N/mm$^2$ and 5 N/mm$^2$, between 16 N/mm$^2$ and 6 N/mm$^2$, between 15 N/mm$^2$ and 7 N/mm$^2$, between 14 N/mm$^2$ and 7 N/mm$^2$, between 13 N/mm$^2$ and 7 N/mm$^2$, and most preferably between 12 N/mm$^2$ and 8 N/mm$^2$.

It is further preferred that the temperature of the melt during extrusion is controlled to less than 260° C., more preferably less than 240° C. and most preferably less than 220° C. Relatively low extrusion temperatures allow the production of a plasticized poly vinyl acetal sheet with low yellowness as measurable as a Colorquest db value, even in combination with the weak organic acids used for the process according to the invention. Preferably the process is controlled to result in plasticized poly vinyl acetal sheet exhibiting a db value of not more than 2, preferably not more than 1.5 and most preferably not more than 1, in 0.76 mm thickness.

Polyvinyl Acetal

The polyvinyl acetals used in accordance with the invention are produced by acetalisation of polyvinyl alcohol or ethylene vinyl alcohol copolymer.

The mixture can contain more than one polyvinyl acetal, each having a different polyvinyl alcohol content, degree of acetalisation, residual acetate content, ethylene proportion, molecular weight and/or different chain lengths of the aldehyde of the acetal groups.

In particular, the aldehydes or keto compounds used for the production of the polyvinyl acetals can be linear or branched (that is to say of the "n" or "iso" type) containing 2 to 10 carbon atoms, which leads to corresponding linear or branched acetal groups. The polyvinyl acetals are referred to accordingly as "polyvinyl (iso)acetals" or "polyvinyl (n)acetals".

The polyvinylacetal used in accordance with the invention results in particular from the reaction of at least one polyvinyl alcohol with one or more aliphatic unbranched ketocompounds containing 2 to 10 carbon atoms. To this end, n-butyraldehyde is preferably used.

The polyvinyl alcohols or ethylene vinyl alcohol copolymers used to produce the polyvinyl acetals in the films A or B may be identical or different, pure or a mixture of polyvinyl alcohols or ethylene vinyl alcohol copolymers with different degree of polymerisation or degree of hydrolysis.

The polyvinyl acetate content of the polyvinyl acetals can be set by use of a polyvinyl alcohol or ethylene vinyl alcohol copolymer saponified to an appropriate degree. The polarity of the polyvinyl acetal is influenced by the polyvinyl acetate content, whereby the plasticiser compatibility and the mechanical strength of the respective layer also change. It is also possible to carry out the acetalisation of the polyvinyl alcohols or ethylene vinyl alcohol copolymers with a mixture of a number of aldehydes or keto compounds.

The mixture preferably contains polyvinyl acetals having a proportion of polyvinyl acetate groups based on the layers, either identically or differently, of 0.1 to 20 mol %, preferably 0.5 to 3 mol %, or 5 to 8 mol %.

The polyvinyl alcohol content of the polyvinyl acetal of the mixture may be, in order of increasing preference, between 6-26% by weight, 8-24% by weight, 10-22% by weight, 12-21% by weight, 14-20% by weight, 16-19% by weight, and most preferably between 16 and 21% by weight or 10-16% by weight.

The mixture preferably contains uncrosslinked polyvinyl acetal. The use of cross-linked polyvinyl acetals is also possible. Methods for cross-linking polyvinyl acetals are described, for example, in EP 1527107 B1 and WO 2004/063231 A1 (thermal self-cross-linking of polyvinyl acetals containing carboxyl groups), EP 1606325 A1 (polyvinyl acetals cross-linked with polyaldehydes) and WO 03/020776 A1 (polyvinyl acetal cross-linked with glyoxylic acid).

Plasticizer

The mixture extruded in accordance with the invention may contain, as plasticiser, one or more compounds selected from the following groups:

esters of polyvalent aliphatic or aromatic acids, for example dialkyl adipates, such as dihexyl adipate, dioctyl adipate, hexyl cyclohexyl adipate, mixtures of heptyl adipates and nonyl adipates, diisononyl adipate, heptyl nonyl adipate, and esters of adipic acid with cycloaliphatic ester alcohols or ester alcohols containing ether compounds, dialkyl sebacates, such as dibutyl sebacate, and also esters of sebacic acid with cycloaliphatic ester alcohols or ester alcohols containing ether compounds, esters of phthalic acid, such as butyl benzyl phthalate or bis-2-butoxyethyl phthalate.

esters or ethers of polyvalent aliphatic or aromatic alcohols or oligo ether glycols with one or more unbranched or branched aliphatic or aromatic substituents, for example esters of glycerol, diglycols, triglycols or tetraglycols with linear or branched aliphatic or cycloaliphatic carboxylic acids; Examples of the latter group include diethylene glycol-bis-(2-ethyl hexanoate), triethylene glycol-bis-(2-ethyl hexanoate), triethylene glycol-bis-(2-ethyl butanoate), tetraethylene glycol-bis-n-heptanoate, triethylene glycol-bis-n-heptanoate, triethylene glycol-bis-n-hexanoate, tetraethylene glycol dimethyl ether and/or dipropylene glycol benzoate phosphates with aliphatic or aromatic ester alcohols, such as tris(2-ethylhexyl)phosphate (TOF), triethyl phosphate, diphenyl-2-ethylhexyl phosphate, and/or tricresyl phosphate esters of citric acid, succinic acid and/or fumaric acid.

By definition, plasticisers are organic liquids having a high boiling point. For this reason, further types of organic liquids having a boiling point above 120° C. can also be used as plasticiser. The preferred plasticizers are triethylene glycol-bis-2-ethylhexanoate (3GO or 3G8), bis-(2-butoxyethyl) adipate (DBEA), bis-(2-butoxyethoxyethyl)adipate (DBEEA), and Diisononyl cyclohexane-1,2-dicarboxylate (DINCH).

In addition, the mixture may contain further additives, such as residual quantities of water, UV absorber, antioxidants, adhesion regulators, optical brighteners or fluorescent additives, stabilisers, colorants, processing aids, inorganic or organic nanoparticles, and/or pyrogenic silicic acid.

EXAMPLES

Process trials were conducted as following: PVB resin, plasticizer were fed in parallel into the inlet zone of an twin screw extruder. An aqueous solution of magnesium-acetate-tetrahydrate was separately metered into the inlet zone. Versatic® acid 10 was fed as a solution in the main volume of plasticizer. The sheet was extruded from a slit die and collected in the winding section.

Test laminates in the dimension 30×30 cm were obtained by combining clear glass (Planilux® 2.1 mm, cleaned with deionized water<5 μS on a flat glass washing machine) with the different sample films from the process trials and producing a pre-laminate in a nip-roller furnace followed by a standard autoclave step.

Alkaline Titer of Polyvinyl Acetal Resin Prior to Extrusion (ATP)

100 ml of ethanol are placed in a 250 ml laboratory flask and a few drops of mixed indicator are added (0.1% ethanolic solution of methylene blue and neutral red (1:1)). Diluted hydrochloric acid (0.005M) is added until the point where the indicator changes from green to blue. 3 g of powdery polyvinyl acetal resin are added with stirring. Gentle heating may be required for complete dissolution. After dissolution is complete, the solution is either green in the case of prevalent alkalinity in the resin or blue in case of prevalent acidity in the resin. For determination of alkaline titer, the solution is titrated with diluted hydrochloric acid (0.005M) to the equivalence point. For determination of the acid titer, the solution is titrated with diluted sodium hydroxide (0.005M) until the equivalence point. Acid titer can also be quoted as negative alkaline titer. Alkaline titer=ml 0.005M HCl×100/resin weight (g)×2. Acid titer=ml 0.005M NaOH×100/resin weight (g)×2.

Alkaline Titer and Acid Number of Polyvinyl Acetal Sheet (ATS, ANS)

Alkaline titer and acid number are measured as follows: 3-4 g of the polyvinyl acetal film are dissolved in 100 ml mixture of ethyl alcohol/THF (80:20) on a magnetic stirrer overnight. 10 ml of diluted hydrochloric acid (c=0.01 mol/1) are added. Excess hydrochloric acid is potentiometrically titrated with a solution of tetrabutylammonium hydroxide in 2-propanol (TBAH, c=0.01 mol/1) using a titroprocessor (e.g. by Metrohm) against a blank sample. Alkaline titer is calculated for the first equivalence point (1) in the titration curve as: ml (0.01 mol/l HCl) per 100 g of sample=(ml TBAH(1)blank−ml TBAH(1)sample)×100/sample weight in g. Acid number is calculated for the second equivalence point (2) in the titration curve as: meq/kg=(ml TBAH(2) sample−ml TBAH(2)blank)×10/sample weight in g.

Yellowness db:

To determine the yellow value of the extruded PVB film, a laminated glass containing a film of thickness 0.76 mm with two panes of 2.1 mm Planilux glass was measured using the ColorQuest XE set to Hunterlab 2°/C. with this method, the natural color of the glass is subtracted by measuring the two panes of identical glass batch as zero sample and the contribution of the intermediate layer to the yellow coloring is established numerically as the yellow value db.

Samples with the composition according to table 1 were extruded on an extrusion line comprising a twin screw extruder with a maximum melt temperature of 210 C.° and laminated between two glass sheets to evaluate the performance.

As can be seen from table 2, formation of the ACA-plate out is effectively suppressed by the addition of the organic acids according to the invention.

TABLE 1

| | | Comparative Example | Example 1 | Example 2 | Example 3 |
|---|---|---|---|---|---|
| PVOH content of PVB resin | weight-% in PVB | 20.0 | 20.0 | 20.0 | 20.0 |
| Alkaline titer of PVB resin | ATP-units | 5 | 5 | 5 | 5 |
| PVB resin in extruded mixture | weight-% | 72.5 | 72.5 | 72.5 | 72.5 |
| 3G8 plasticizer | weight-% | 25.0 | 25.0 | 25.0 | 25.0 |
| DBEA plasticizer | weight-% | 2.5 | 2.5 | 2.5 | 2.5 |
| UV-absorber Tinuvin® 326 | weight-% | 0.15 | 0.15 | 0.15 | 0.15 |
| Antioxidant Irganox® 245 | weight-% | 0.05 | 0.05 | 0.05 | 0.05 |
| Versatic® Acid 10 | weight-% | — | 0.025 | 0.05 | 0.075 |
| deionized water for dosage of Magnesium acetate | weight-% | 0.5 | 0.5 | 0.5 | 0.5 |
| Magnesium acetate tetrahydrate | weight-% | 0.04 | 0.04 | 0.04 | 0.04 |
| evaluation of process trial | | | | | |
| alkaline-titer of extruded sheet | ATS-units | 38 | 40 | 43 | 38 |
| acid concentration in extruded sheet | ANS-units | 3.0 | 4.5 | 5.0 | 7.0 |
| magnesium per ion chromatography | ppm | 50.1 | 47 | 51.9 | 53 |
| sodium per ion chromatography | ppm | 14.4 | 13.5 | 14.2 | 13.8 |
| residual water in melt when exiting die | weight-% | 0.20% | 0.21% | 0.22% | 0.21% |
| ACA plate-out observed in extrusion die | | severe | slight | weak | none |

TABLE 2

| Evaluation of laminates | | Comparative Example | Example 1 | Example 2 | Example 3 |
|---|---|---|---|---|---|
| Moisture content in PVB-layer | | 0.46 | 0.47 | 0.46 | 0.47 |
| Pummel average air/tin side | | 3.5 | 2 | 1.5 | 1.5 |
| yellowness db Colorquest | | 0.75 | 0.69 | 0.65 | 0.64 |
| Haze ASTM 1003 | | 0.06 | 0.14 | 0.14 | 0.11 |
| Compressive shear strenght | N/mm2 | 12 | 9.81 | 9.32 | 7.88 |
| Grammage of film as laminated | g/m2 | 800 | 800 | 795 | 795 |
| Safe break height ECE R43 with 2.26 kg ball | m | 6 | 5.25 | 5.5 | 5.75 |

What is claimed is:

1. A process for minimizing extruder deposits in the extrusion of a mixture comprising at least one polyvinyl acetal, at least one plasticizer, and at least one alkaline earth metal salt of a carboxylic acid, comprising:

adding, in its acid form, 0.001-1 wt. % of at least one carboxylic acid having 4 to 30 carbon atoms to the mixture prior to or during extrusion, wherein the wt. % is based on a combined weight of polyvinyl acetal resin and plasticizer, and extruding to form a plasticized polyvinyl acetal film.

2. The process of claim 1, wherein the polyvinyl acetal resin prior to extrusion has an alkaline titer between −10 and 50 ml 0.01 Molar HCl/100 g resin.

3. The process of claim 1, wherein the plasticized polyvinyl acetal film after extrusion has an alkaline titer between 15 and 80 ml 0.01 Molar HCl/100 g resin.

4. The process of claim 1, wherein the mixture contains 5-200 ppm alkaline earth metal ions.

5. The process of claim 1, wherein the mixture contains alkali metal salts in an amount of from 0.001 to 0.1 wt. % based on the weight of polyvinyl acetal and plasticizer.

6. The process of claim 1, wherein the at least one alkaline earth metal salt of a carboxylic acid comprises at least one of magnesium acetate, magnesium 2-ethylbutyrate, magnesium 2-ethylhexanoate and magnesium neodecanoate.

7. The process of claim 1, wherein the mixture comprises polyvinyl butyral with a proportion of vinyl alcohol groups of from 6 to 26% by weight.

8. The process of claim 1, wherein the at least one carboxylic acid is added to the mixture before extrusion.

9. The process of claim 1, wherein the at least one carboxylic acid is added to the mixture during extrusion.

10. The process of claim 1, wherein the at least one carboxylic acid is dissolved in the plasticizer prior to extrusion.

11. The process of claim 1, wherein the at least one carboxylic acid is suspended in the plasticizer prior to extrusion.

12. The process of claim 1, wherein the at least one carboxylic acid is added with the at least one earth alkaline salt of a carboxylic acid as an aqueous solution or suspension.

13. The process of claim 1, wherein the at least one carboxylic acid is added to the mixture in liquid form separately.

14. The process of claim 1, wherein the at least one carboxylic acid is added to the mixture in solid form separately.

15. The process of claim 1, wherein the at least one carboxylic acid has a pKa-value of 4.75 or higher.

16. The process of claim 1, wherein the at least one carboxylic acid comprises at least one of a 2,2-dimethyl propionic acid, 2,2-dimethyl propionic acid, 2,2-dimethyl butyric acid, 2,2-dimethyl pentanoic acid, 2,2-dimethyl hexanoic acid, 2,2-dimethyl heptanoic acid, 2,2-dimethyl octanoic acid, 2,2-dimethyl nonanoic acid, 2,2-dimethyl decanoic acid, or neodecanoic acid.

17. The process of claim 1, wherein at least one carboxylic acid having from 4 to 30 carbon atoms is a monocarboxylic acid.

18. The process of claim 1, wherein at least one carboxylic acid having from 4 to 30 carbon atoms is a carboxylic acid which is branched at a carbon atom a to a carboxyl group.

19. The process of claim 1, wherein at least one carboxylic acid having from 4 to 30 carbon atoms is a neo carboxylic acid having a quaternary carbon atom a to a carboxyl group.

* * * * *

UNITED STATES PATENT AND TRADEMARK OFFICE
CERTIFICATE OF CORRECTION

PATENT NO. : 10,293,517 B2
APPLICATION NO. : 15/248314
DATED : May 21, 2019
INVENTOR(S) : Uwe Keller et al.

It is certified that error appears in the above-identified patent and that said Letters Patent is hereby corrected as shown below:

In the Claims

Column 10, Line 25, Claim 18:
Delete: "... acid which is branched at a carbon atom a to a carboxyl..."
Insert: --... acid which is branched at a carbon atom $\alpha$ to a carboxyl...--

Column 10, Line 29, Claim 19:
Delete: "... carboxylic acid having a quaternary carbon atom a to a..."
Insert: --... carboxylic acid having a quaternary carbon atom $\alpha$ to a...--

Signed and Sealed this
Third Day of March, 2020

Andrei Iancu
*Director of the United States Patent and Trademark Office*